G. DIETZ.
REFLECTING CAMERA.
APPLICATION FILED JAN. 11, 1910.

1,133,369.

Patented Mar. 30, 1915.

2 SHEETS—SHEET 1.

WITNESSES:

INVENTOR
Gustav Dietz.
BY
ATTORNEY

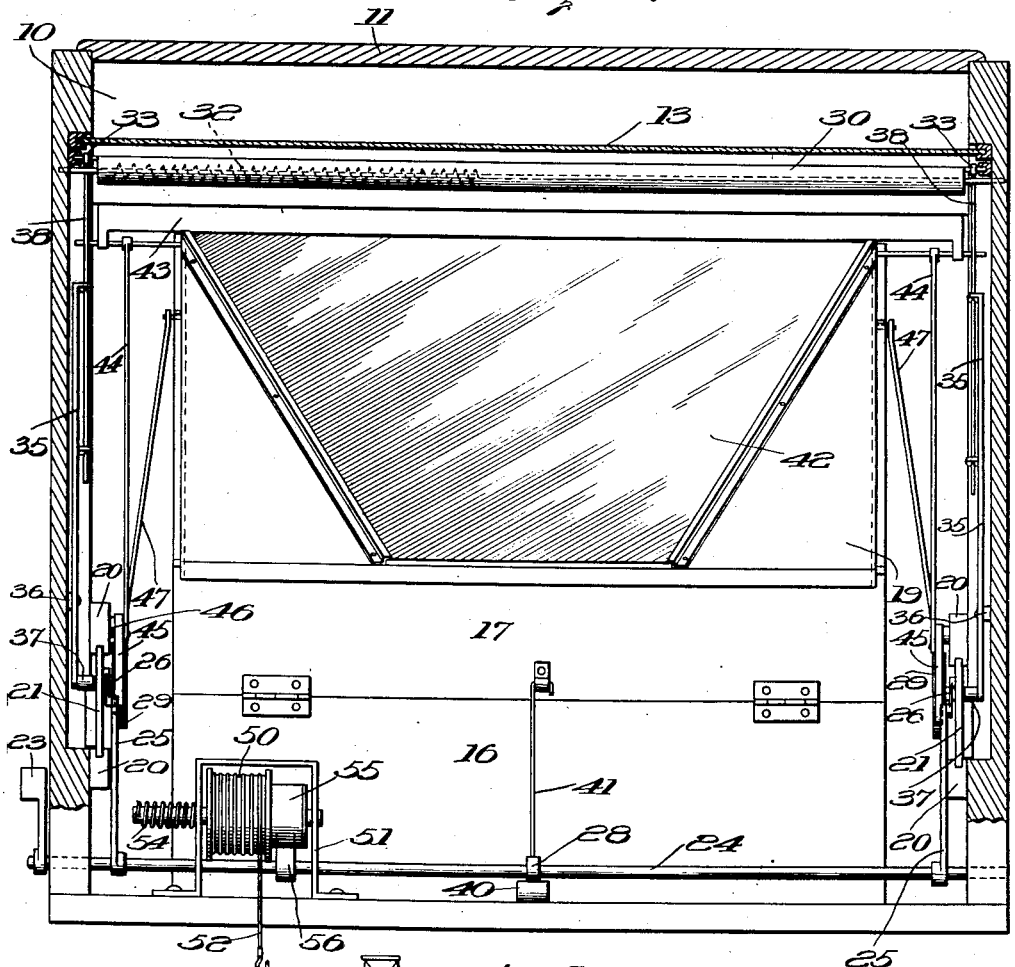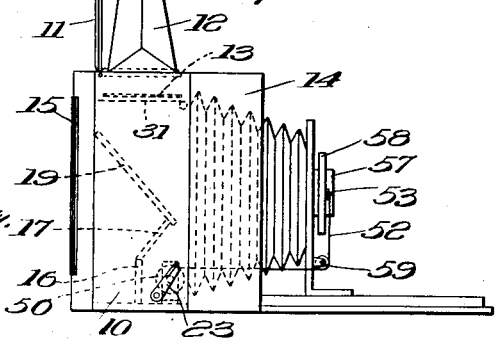

UNITED STATES PATENT OFFICE.

GUSTAV DIETZ, OF YONKERS, NEW YORK, ASSIGNOR TO MULTI SPEED SHUTTER COMPANY, OF NEW YORK, N. Y., A CORPORATION OF NEW YORK.

REFLECTING-CAMERA.

1,133,369.  Specification of Letters Patent.  Patented Mar. 30, 1915.

Application filed January 11, 1910. Serial No. 537,386.

*To all whom it may concern:*

Be it known that I, GUSTAV DIETZ, a citizen of the United States, residing at Yonkers, in the county of Westchester and State of New York, have invented new and useful Improvements in Reflecting-Cameras, of which the following is a specification.

My invention relates to cameras in which a movable reflector is provided for throwing the object to be taken upon a focusing surface, and its object is to so organize the parts that this principle may be used with a camera having the ordinary between-lens shutter.

The invention also relates to an apparatus by means of which the reflector actuating mechanism and a shutter of the above mentioned type may be actuated by the manipulation of a single member.

A further object of my invention is to provide a device which may be readily attached to ordinary folding cameras to thereby change them at will into reflecting cameras with the attendant advantages of such apparatus.

These and other advantages will appear in the following specification in which I will describe my invention, and will point out the novel features thereof in the appended claims.

Figure 1:
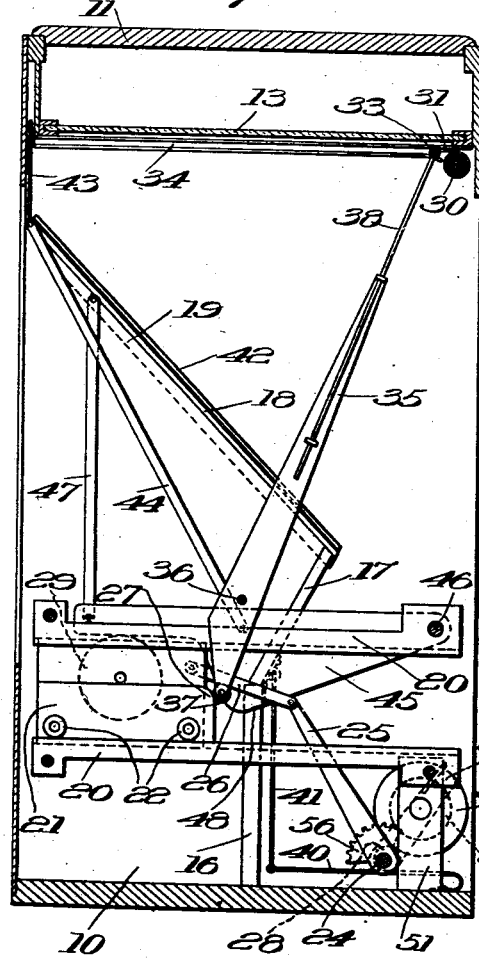
Figure 2:
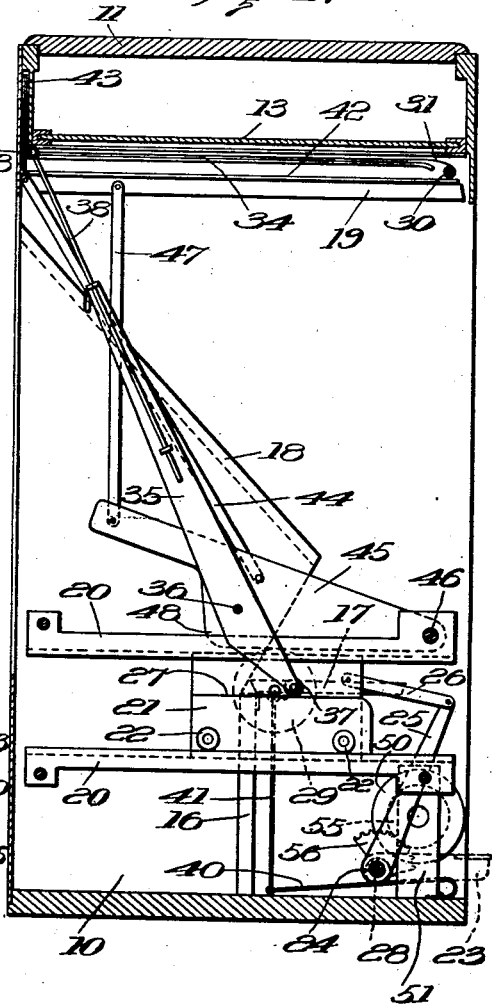
Figure 3:
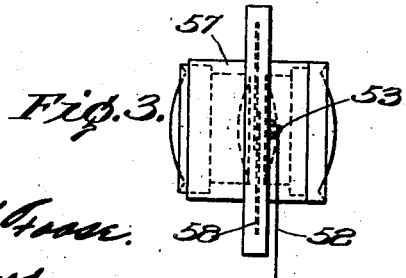

Referring to the drawings, Figure 1 is a sectional side elevation of a reflector compartment of a camera and its actuating mechanism, with its various parts shown in certain relative positions. Fig. 2 is a similar view of the same parts shown in different operative positions. Fig. 3 is a side elevation of a lens-barrel, showing the position of the shutter. In Fig. 4 I have shown the reflector compartment of Figs. 1 and 2 in front elevation, partly in section; and in Fig. 5, the manner in which this device is applied to an ordinary folding camera is illustrated.

Like characters of reference designate corresponding parts in all of the figures.

10 designates a box-like frame, open at front and back, which supports the various parts of my apparatus and forms a reflector-compartment. The cover 11 of this frame is hinged so that it may be raised, as shown in Fig. 5, to allow inspection of the focusing surface. The top of the frame or box is also preferably surrounded by a collapsible hood 12. 13 is the focusing surface which may be of ground glass. In Fig. 5 I have shown the manner in which this frame 10 is used to form an additional compartment within a camera of ordinary construction. 14 designates the camera-box and 15 its back-plate which supports the sensitized plates and is usually affixed directly to the camera-box, but in this case the frame 10 is affixed to the back of the camera-box, and the back-plate is affixed to the back of this frame. The frame 10 may itself be divided into two compartments, and, for this purpose, is provided with a transverse wall 16, to which is hinged a flap 17, and, with shoulders 18 against which the reflector frame 19 is arranged to rest when in one of its positions.

Affixed to the side walls of the box-like frame 10 are tracks 20, 20 in which actuating slides 21 are supported. Rollers 22 may be provided to reduce the running friction of these slides. The actuating lever 23 is affixed to a rotatable shaft 24 which, by levers 25 and links 26, is connected with the slides 21.

Directly below one edge of the ground glass 13 is a roller 30. This carries an opaque curtain 31 and is provided with an internal spring 32 which tends to roll the curtain up. The outer edge of the curtain is fastened to a transverse rod 33, the ends of which are guided by the tracks 34.

35 are curtain actuating levers pivoted at 36 to the sides of the box. 37 designates antifriction rollers on the ends of these levers. 38 are rods longitudinally slidable in lever 35 and connect these levers with the ends of the transverse curtain rod 33.

A cam surface 27 on the slide 21 is arranged to act against the lower end of the levers 35 to cause the curtain to be drawn under the ground glass and to hold it against the action of its spring during desired parts of the operation, as will more fully appear hereinafter.

40 is a spring which, through a connection 41, is arranged to push the flap 17 up into the position in which it is shown in Figs. 1, 4 and 5. An eccentric cam 28, affixed to shaft 24, will, when rotated, press this spring down and cause the flap to be swung down into the position in which it is shown in Fig. 2.

The frame 19 supports a mirror 42. The upper edge of this frame is pivoted to a vertical slidable member 43. This member and the upper edge of the mirror frame are supported by rods 44 which are pivotally connected with actuating arms 45. These actuating arms are pivoted at 46 to the frame 10. Another pair of rods 47 connect the free ends of these actuating arms with the sides of the mirror frame at points below its upper edge. The lower surfaces of the actuating arms are constructed to form cam surfaces 48 with which rollers 29 on the slide 21 are arranged to engage.

A drum 50 is rotatably supported within a bracket 51 affixed to the frame 10. Around this drum is wound a flexible cord 52 on the end of which is a hook 53, by means of which this cord may be fastened to the release-arm of the shutter 58. A light spring 54 around the drum has a tendency to turn the drum in the direction to wind up the cord and acts to maintain the cord in tension. To one end of the drum is affixed a cylindrical friction member 55, the surface of which is covered with a resilient material such as medium-hard rubber. Directly below this friction member is a segmental cam 56 affixed to the shaft 24. The outer edge of this cam is serrated or roughened.

In Fig. 3 the ordinary lens-barrel 57 is shown with the shutter 58 interposed between the lenses which it supports.

I have already shown how this device may be applied to a camera of ordinary construction. The cord 52 is carried forward under the pulley 59 to the release-arm of the shutter. In its usual position the cam 56 is out of engagement with the friction surface 55 so that the drum 50 is free to rotate in either direction and so that the cord may be drawn forth a desired amount. The spring 54 keeps it taut and also compensates for any movement imparted to it by the usual focusing operation in which the position of the lens-barrel, relative to the other parts of the camera, is adjusted. With the parts in the positions shown in Fig. 1, the shutter 58 may be opened without affecting the sensitized plate held behind this compartment by the back 15. The light rays then admitted will be reflected upon the ground glass 13 which is the same distance from the surface of the mirror as is the surface of the sensitized plate. Therefore, the images may be focused on the ground glass and the operator has the advantage of seeing them projected on the focusing surface in the same proportions and sizes as those with which they will be later thrown upon the sensitized plate. The lever 23 is then depressed to expose the plate. The first effect of the rotation now imparted to shaft 24 will be to move the cam surface 23 of the slide 21 against roller 37, and to push the latter forward, thus drawing curtain 31 across the ground glass 13 against the action of spring 32, thereby shutting off all light from that direction. At the same time, cam 56, engaging friction surface 55, will rotate the drum and pull the cord 52 with sufficient force to close the shutter 58. The curtain 31 will be held in its closed position during the remainder of the operation. The continued movement of slide 21 will bring the rollers 29 into engagement with the cam surfaces on actuating arms 45 and will raise the latter into the position shown in Fig. 2. This, through the connecting rods 44 and 47, will raise the whole mirror frame and bring it up into the position parallel with the ground glass 13. At the same time the flap 17 will be swung out of the way in the manner already described. The various parts will then be brought into the positions in which they are shown in Fig. 2. Now the field is clear between the lens and the sensitized plate, and further rotation of drum 50 will reopen the shutter and make the exposure. The various parts will then be returned to their initial positions, and, if desired, a spring may be provided to cause this part of the operation to be performed automatically.

It will be understood that the shutter to permit of the aforesaid operation will be adapted upon partial forward movement to move from a normal open position to a closed position and then upon a further forward movement to reopen for the exposure. Further description of the shutter is deemed unnecessary as a continuous movement such as employed to actuate the flies of many so-called "instantaneous" shutters from a normal closed position, obviously, may in like manner be employed to actuate the shutter flies from a normal open position as here required.

With the apparatus above described a camera may be constructed with all the advantages of a reflecting camera, with the additional advantage of using a shutter associated with the lens-barrel. Moreover, the reflector actuating mechanism and the shutter release are actuated by the depression of a single actuating lever.

The peculiar supporting and actuating mechanism for the mirror makes possible the use of a small light mirror which will reflect the image centrally upon the focusing surface and which will quickly move the reflector up out of the way when desired without increasing the height of the reflector compartment. The curtain device is also associated with these parts in such a way that it excludes light entering the top of the compartment during the time of movement of the reflector frame.

Obviously, cameras may be constructed embodying this invention, but I have already shown that one of its advantages is that the reflector compartment is complete in itself, and that it may be used in conjunction with cameras of ordinary construction.

What I claim is:—

1. An attachment for cameras having removable backs, said attachment being constructed to form a compartment between the camera and its back, a movable reflector and a member having a focusing surface within said compartment, and means for covering said surface during the movement of the reflector.

2. An attachment for cameras having removable backs, said attachment being constructed to form a compartment between the camera and its back, a movable reflector and a member having a focusing surface within said compartment, a curtain for covering the focusing surface, and a movable member arranged to first draw said curtain across the focusing surface and to then raise the reflector.

3. An attachment for cameras having removable backs, said attachment being constructed to form a compartment, between the camera and its back, open at front and back, a reflector set obliquely across and dividing said compartment, a member above the reflector having a focusing surface, and means for covering said member and then raising the reflector up into proximity with the member.

4. An attachment for cameras having removable backs, said attachment being constructed to form a compartment, between the camera and its back, open at front and back, a hinged flap, a reflector set obliquely across said compartment and arranged with said flap to obstruct the passage of light through the compartment, a member above the reflector having a focusing surface, a curtain for covering said member, a movable member arranged to first draw said curtain across the focusing surface and to then move the flap and the reflector out of their obstructing positions.

5. In a reflecting camera, a hinged flap, a movable reflector, an actuating shaft, intermediate mechanism, a pivoted connection between the upper edge of the reflector and said mechanism, said mechanism being arranged to swing the flap about its hinge to shift said pivoted connection and to swing the reflector about its pivot upon the rotation of said shaft.

6. In a reflecting camera having a shutter, a hinged flap, a movable reflector, an actuating shaft, intermediate mechanism, a pivoted connection between the upper edge of the reflector and said mechanism, said mechanism being arranged to swing the flap about its hinge to shift said pivoted connection and to swing the reflector about its pivot upon the rotation of said shaft, a drum, a cord around said drum arranged to be connected with the shutter, a spring acting upon the drum to maintain said cord under tension, and a cam upon the actuating shaft arranged to be brought into engagement with said drum to actuate the shutter.

7. In a reflecting camera having a shutter, a hinged flap, a movable reflector, an actuating shaft, intermediate mechanism, a pivoted connection between the upper edge of the reflector and said mechanism, a member having a focusing surface, a curtain arranged to cover said surface, said mechanism being arranged to draw said curtain across the focusing surface, to swing the flap about its hinge, to shift said pivoted connection, and to swing the reflector about its pivot upon the rotation of said shaft, a drum, a cord around said drum arranged to be connected with the shutter, a spring acting upon the drum to maintain said cord under tension, and a cam upon the actuating shaft normally out of engagement with said drum but arranged to be brought into engagement with said drum to actuate the shutter.

8. In a reflecting camera having a shutter, a hinged flap, a movable reflector, an actuating shaft, intermediate mechanism, a pivoted connection between the upper edge of the reflector and said mechanism, said mechanism being arranged to swing the flap about its hinge to shift said pivoted connection and to swing the reflector about its pivot upon the rotation of said shaft, actuating mechanism connected with the shutter and normally disconnected from the shaft when the lense is being focused, but engaged and operated by the shaft when the shaft or the main actuating mechanism is operated.

9. In a camera the combination with a lens and a suitable shutter, of a focusing surface, a movable reflector adapted to reflect on said surface, separate means to cover said surface, an operating lever and mechanism actuated by said lever first to cause covering of the focusing surface and thereafter removal of the reflector from operative position.

10. In a camera the combination with a lens and a suitable shutter, of a focusing surface, a movable reflector adapted to reflect on said surface, separate means to cover said surface, an operating lever, an actuating slide connected to be reciprocated thereby, and connections engaged by said slide to first effect the covering of the focusing surface and thereafter removal of the reflecting surface from obstructing position.

11. In a camera the combination with a lens and a suitable shutter, of a focusing surface, a movable reflector adapted to reflect on said surface, a curtain arranged to cover said surface, means to guide the movement of the curtain, an operating lever, a curtain actuating lever suitably fulcrumed, a slidable extension to said lever connected to the curtain and connections from the operating lever to said actuating lever to move the curtain and connections from the operating lever to the movable reflector to remove said reflector from obstructing position.

12. In a camera the combination with a suitable inclosing frame, a back complemental to said frame, a lens and a suitable shutter, of a detachable compartment arranged intermediate of the frame and back, said compartment having arranged therein a movable reflector, a focusing surface for said reflector, means to cover said focusing surface, an operating lever and intermediate mechanism to effect covering of the focusing surface and removal of the reflector from obstructing position.

13. A camera comprising a suitable inclosing frame, a back complemental to said frame and adapted to hold a sensitized element, a lens-barrel, a suitable shutter and in combination therewith a detachable compartment arranged intermediate of the frame and back, a movable reflector within the compartment intermediate of the lens and the sensitized element and means to remove the reflector from obstructing position.

14. A camera comprising a suitable inclosing frame, a back complemental to said frame and adapted to hold a sensitized element, a lens barrel, a suitable shutter and in combination therewith, a detachable compartment arranged intermediate of the frame and back, a movable reflector within the compartment intermediate of the lens and the sensitized element, a focusing surface within the compartment to receive the image from the reflector and means to actuate the reflector.

15. A camera comprising a suitable inclosing frame, a back complemental to said frame and adapted to hold a sensitized element, a lens barrel, a suitable shutter and in combination therewith, a detachable compartment arranged intermediate of the frame and back, a movable reflector within the compartment intermediate of the lens and the sensitized element, a focusing surface within the compartment to receive the image from the reflector, a curtain, and a single means to actuate the reflector and the curtain.

16. A camera comprising a lens-barrel and a shutter arranged to be moved therewith, a back to hold a sensitized element to be arranged in the focal plane of the lens, a movable reflector arranged intermediate of the lens and the back for the sensitized element, an actuating member, an extensible connection to the shutter to accommodate for the movement thereof, actuated by said member and connections from said member to move the reflector.

17. A camera comprising a lens-barrel and a shutter arranged to be moved therewith, a back to hold a sensitized element to be arranged in the focal plane of the lens, a movable reflector intermediate of the lens and back for the sensitized element, an extensible connection to the shutter to accommodate for the movement thereof, and actuating means for actuating said reflecting member and the shutter through said connection but normally disengaged therefrom to permit the lens adjustment.

18. A camera comprising a suitable inclosing frame, a lens-barrel and a shutter arranged to be moved therewith and in combination therewith a detachable compartment fitted to the rear of said frame, a back for a sensitized element to be arranged in the focal plane of the lens, a movable reflector within said compartment intermediate of the lens and back for the sensitized element, actuating means for the reflector and the shutter carried by said compartment and an extensible connection from said actuating means to the shutter, said connection being normally disengaged from the actuating means to permit of lens adjustment.

19. A camera having a lens-barrel and a shutter arranged to be moved therewith, a back for a sensitized element to be arranged in the focal plane of the lens, a movable reflector intermediate of the lens and the back for the sensitized element, an extensible connection to the shutter, said connection comprising a drum, a spring to actuate said drum and a flexible connecting cord carried by said drum, actuating means for the reflector and an engaging part controlled thereby to actuate the drum.

20. A camera having a lens-barrel and a shutter arranged to be moved therewith, a back for a sensitized element to be arranged in the focal plane of the lens, a movable reflector intermediate of the lens and the back for the sensitized element, an extensible connection to the shutter, said connection comprising a drum, a spring to actuate the drum, an engaging collar on the drum, and a flexible connecting cord carried by said drum, actuating means for the reflector and a segmental engaging part controlled by said actuating means frictionally to engage the drum collar to operate the shutter.

21. In a reflecting camera, a movable reflector, an actuating mechanism therefor, and a supporting frame for the reflector suitably fulcrumed on the actuating mechanism adjacent the upper end of said frame, said mechanism being operative to swing the reflector on its fulcrum point and to shift the fulcrum point therewith whereby the reflector is removed from obstructive position, said fulcrum point and the upper edge of the mirror being moved straight up.

22. In a reflecting camera, a movable reflector, a slidable fulcrum member, a supporting frame for the reflector fulcrumed to said member adjacent the upper end of said frame and actuating mechanism operative to swing the reflector on its fulcrum and to raise said fulcrum member thereby to remove the reflector from obstructive position, the movement of said fulcrum member being straight upwardly.

23. In a reflecting camera, a movable reflector, a supporting frame therefor, a rocking arm suitably fulcrumed, pivotal connections from the free end of said arm to the supporting frame, said connections being connected to the frame near its upper edge whereby said frame is both rocked and lifted and means to operate the rocking arm to effect removal of the reflector from obstructing position, the said upper edge of the reflector and frame being moved straight upwardly during such removal.

24. A reflecting camera having a lens and a suitable shutter, a movable reflector arranged in the focal plane of the lens, an operating part, connections therefrom to the reflector to effect the removal of the reflector from obstructing position, a movable flap arranged to coöperate with the reflector to form a light proof protecting wall and means actuated from the operating lever to effect the removal of the flap from obstructing position.

25. A reflecting camera having a lens and a suitable shutter, a movable reflector arranged in the focal plane of the lens, a slidable fulcrum piece for the reflector, a movable flap, said slidable piece, reflector and flap being arranged to coöperate in forming a light-tight protecting wall, an operating lever and connections therefrom to effect the movement of said coöperating parts to leave the focal plane of the lens unobstructed.

26. A camera comprising a suitable inclosing frame, a back complement to said frame, a lens, a suitable shutter and in combination therewith, a detachable compartment arranged intermediate of the frame and back and having therein a movable reflector arranged to be positioned in the focal plane of the lens, a movable flap arranged to coöperate with the reflector to form a light-proof protecting wall and actuating mechanism to effect the removal of the reflector and flap from obstructing position.

27. In a camera, the combination with a lens and a suitable shutter, of a focusing surface, a movable reflector adapted to reflect on said surface, means to cover said surface, an operating lever, an actuating slide, tracks therefor, connections from the operating lever to said slide whereby it is reciprocated and connections engaged by said slide to effect the covering of the focusing surface and removal of the reflecting surface from obstructing position.

28. A camera having a lens-barrel and a shutter arranged to move therewith, back for a sensitized element to be arranged in the focal plane of the lens, a movable reflector intermediate of the lens and the back for the sensitized element, an extensible connection to the shutter, said connection comprising a drum, a spring arranged to actuate the drum, an engaging collar on the drum and a flexible connecting cord carried by said drum, an operating shaft suitably journaled, a segmental engaging part carried by said shaft frictionally to engage the drum collar to operate the shutter and connections from said operating shaft to the reflector to effect its removal from obstructing position.

29. In a camera the combination with a lens and a suitable shutter, of a focusing surface, a movable reflector adapted to reflect on said surface, means to cover said surface, upper and lower track members arranged to form a slideway, an actuating slide arranged therein, anti-friction rollers on the slide, a lever suitably fulcrumed and connected to effect the covering of the focusing surface, a roller on the lever lower end, a cam-surface on the slide to engage and operate said lever, a reflector operating lever suitably fulcrumed, connections therefrom to the reflector, a cam-surface on the lever, an engaging roller carried by the slide to engage said cam-surface, an operating lever and connections from the operating lever to the slide whereby it is reciprocated.

30. In a camera the combination with a lens and a suitable shutter, of a focusing surface, a movable reflector adapted to reflect on said surface, means to cover said surface, upper and lower track members arranged to form a slide-way, an actuating slide arranged therein, anti-friction rollers on the slide, a lever suitably fulcrumed and connected to effect the covering of the focusing surface, a cam surface on the slide to engage and operate said lever, an operating lever and connections from the operating lever to the slide whereby it is reciprocated.

31. In a camera the combination with a lens and a suitable shutter, of a movable reflector, a supporting frame therefor, a rocking arm suitably fulcrumed, pivotal connections from the free end of said arm to the supporting frame whereby said frame is rocked, a cam surface on said rocking arm, upper and lower track members arranged to form a slideway, an actuating slide arranged therein, a roller on said slide to engage said cam surface, an operating lever and connections from the operating lever to the slide whereby said slide is reciprocated to effect the removal of the reflector from obstructing position.

32. In a camera the combination with a lens and a suitable shutter, of a focusing surface, a movable reflector adapted to reflect on said surface, a spring actuated curtain arranged to cover said surface, means to guide the movement of the curtain, a curtain actuating lever suitably fulcrumed, a slidable extension to said lever connected to the curtain, an actuating slide arranged to reciprocate in a suitable slideway, a cam on said slide to engage the curtain lever, connections from said slide to the reflector, an operating lever and connections from the operating lever to the slide whereby it is reciprocated.

33. A reflecting camera having a lens and a suitable shutter, a movable reflector arranged in the focal plane of the lens, a slidable fulcrum piece for the reflector, a movable flap, a spring acting thereon normally to hold said flap in raised position, an operating shaft, an operating lever thereon, a cam on said shaft arranged to engage and depress the spring to cause removal of the flap from obstructing position and connections from the operating shaft to the reflector whereby it is removed from obstructing position, said slidable piece, reflector and flap being arranged to coöperate in forming a light tight protecting wall.

34. In a camera the combination with a lens and a shutter arranged adjacent thereto, of a focusing surface, a movable reflector adapted to reflect on said surface, a coil curtain arranged to be uncoiled, to cover said surface, an operating lever, intermediate mechanism whereby the curtain may be drawn to cover the surface and detachable connections to the shutter simultaneously to close said shutter.

35. A camera comprising a suitable inclosing frame, a back complemental to said frame and adapted to hold a sensitized element, a lens barrel, a suitable shutter and in combination therewith a detachable compartment having its front and rear sides fitted to the frame and back respectively, a removable reflector within the compartment intermediate the lens and the back for the sensitized element and means for removing the reflector from said obstructing position.

In testimony whereof I have signed my name to this specification in the presence of two subscribing witnesses.

GUSTAV DIETZ.

Witnesses:
   J. R. MILLWARD,
   ELLA TUCH.